US008183979B2

(12) United States Patent
Squibbs et al.

(10) Patent No.: US 8,183,979 B2
(45) Date of Patent: May 22, 2012

(54) PHYSICAL OBJECT WITH MEMORY TAGS AND APPARATUS FOR WRITING AND USING SUCH OBJECTS

(75) Inventors: Robert Francis Squibbs, Bristol (GB); Richard Anthony Lawrence, S. Glos (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2023 days.

(21) Appl. No.: 11/035,801

(22) Filed: Jan. 14, 2005

(65) Prior Publication Data

US 2005/0172215 A1     Aug. 4, 2005

(30) Foreign Application Priority Data

Jan. 30, 2004   (GB) .................................. 0402035.0

(51) Int. Cl.
| G05B 19/00 | (2006.01) |
| G06F 7/00 | (2006.01) |
| G08B 29/00 | (2006.01) |
| G04B 1/00 | (2006.01) |
| H04Q 1/00 | (2006.01) |

(52) U.S. Cl. ..... 340/5.8; 340/5.86; 340/5.82; 340/572.8; 340/10.51
(58) Field of Classification Search .................... 340/5.8, 340/5.86, 5.82, 572.8, 10.51; 358/448; 715/513, 715/500.1; 345/156; 235/385, 492, 491; 702/187; 571/513, 500.1
See application file for complete search history.

(56) References Cited

U.S. PATENT DOCUMENTS

| 5,418,865 | A |  | 5/1995 | Bloomberg |
| 5,689,238 | A | * | 11/1997 | Cannon et al. ............. 340/572.1 |
| 6,008,727 | A | * | 12/1999 | Want et al. ................. 340/572.1 |
| 6,176,425 | B1 | * | 1/2001 | Harrison et al. ............. 235/385 |
| 6,262,662 | B1 |  | 7/2001 | Back et al. ................. 340/572.1 |
| 6,297,727 | B1 | * | 10/2001 | Nelson, Jr. ................... 340/10.1 |
| 6,446,208 | B1 |  | 9/2002 | Gujar et al. ................... 713/185 |
| 6,964,374 | B1 |  | 11/2005 | Djunik et al. |
| 7,010,647 | B1 |  | 3/2006 | Karamchetty et al. |
| 7,023,344 | B2 | * | 4/2006 | Schaper ...................... 340/572.4 |
| 7,121,462 | B2 |  | 10/2006 | Keronen et al. |

(Continued)

FOREIGN PATENT DOCUMENTS

| EP | 1 398 711 A1 | 3/2004 |
| WO | 82/00062 | 1/1982 |
| WO | 2005/013192 A1 | 2/2005 |

OTHER PUBLICATIONS

Finkenzeller, K., "Fundamental Operating Principles," *RFID Handbook: Fundamentals and Applications in Contactless Smart Cards and Identification*, Ch. 3, 31 pages (2003).

(Continued)

*Primary Examiner* — Nam V Nguyen

(57) ABSTRACT

A physical object is provided that comprises a base medium, such as a paper sheet, and multiple memory tags embedded in it or attached to it. At least one of the memory tags stores location data concerning a location relationship between the object and one or more of the tags. The location data can comprise, for example, tag-location data giving the location in or on the object of the or each tag concerned, or area-of-responsibility data indicating the area of the object's surface for which the or each tag concerned has responsibility in terms of storing related data items such as print data items. Apparatus is provided for writing the location data; apparatus is also provided for subsequently using and displaying the location data particularly for facilitating access to data items stored by the tags.

25 Claims, 8 Drawing Sheets

U.S. PATENT DOCUMENTS

| | | |
|---|---|---|
| 7,170,391 B2 * | 1/2007 | Lane et al. .................. 340/5.82 |
| 2001/0051329 A1 | 12/2001 | Lynch et al. |
| 2002/0145623 A1 | 10/2002 | Decombe |
| 2002/0170973 A1 | 11/2002 | Teraura |
| 2003/0107529 A1 | 6/2003 | Hayhurst et al. |
| 2004/0078749 A1 * | 4/2004 | Hull et al. .................... 715/500 |
| 2004/0092311 A1 | 5/2004 | Weston et al. |

OTHER PUBLICATIONS

*Texas Instruments Registration and Identification System General Reference Manual*, Texas Instruments, 32 pages (Oct. 4, 1999).

European Search Report for European Patent Application No. EP 05 10 0160 (Nov. 24, 2006).

* cited by examiner

PHYSICAL OBJECT WITH MEMORY TAGS AND APPARATUS FOR WRITING AND USING SUCH OBJECTS

FIELD OF THE INVENTION

The present invention relates to physical objects with associated memory tags and apparatus for writing and using such objects; in particular, but not exclusively, the physical objects concerned are printable/printed sheet objects.

BACKGROUND OF THE INVENTION

Memory tags in the form of Radio Frequency Identification (RFID) tags are well known in the prior art. RFID tags come in many forms but all comprise an integrated circuit on which in use information can be stored and a coil which enables it to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. This chip is capable of both being read and being written to. In addition Hitachi has developed a memory tag they call a "mu-chip" which is a chip of 0.4 mm square and operates at 2.45 GHz. This chip is written with data during the manufacturing process in Read-Only-Memory (ROM), but is small enough to be embedded in paper.

SUMMARY OF THE INVENTION

According to one aspect of the present invention there is provided a physical object comprising a base medium with multiple memory tags embedded in it or attached to it, at least one memory tag storing location data concerning a location relationship between one or more of the tags and the object.

The location data stored by a tag preferably relates to at least one tag other than that storing the data though it may additionally or alternatively relate to the storing tag. Advantageously, the location data comprises tag-location data giving the location in or on the object of the or each tag to which the location data relates and/or area-of-responsibility data indicating for the or each tag to which the location data relates, the area of the surface of the physical object for which the tag has responsibility in terms of storing data items relating to that area.

The base medium of the object is, for example, in the form of a sheet and, in particular, a printed sheet with data items corresponding to the printing on the sheet being stored in the memory tags.

According to another aspect of the present invention, there is provided memory-tag writing apparatus comprising a memory-tag writing device for writing data to a memory tag, and a control processor for collecting and organising location data for writing by the memory-tag writing device to at least one memory tag embedded in or attached to a base medium of an object, the location data concerning a location relationship between the object and one or more memory tags embedded in or attached to said base medium.

According to a further aspect of the present invention, there is provided memory-tag reading apparatus comprising:
 a memory-tag reading device for reading location data from memory tags of an object that comprises memory tags embedded in or attached to a base medium, the location data concerning a location relationship between at least one tag and the object;
 a control processor for processing data read from one or more of the memory tags; and
 a display device connected to the control processor and arranged to display a graphical representation of the object;
the control processor being arranged to use the location data read by the reading device to cause the displayed graphical representation of the object to depict said location relationship between the said at least one tag and the object.

In one embodiment of the reading apparatus, the memory-tag reading device is a hand-held reader, the apparatus being arranged to read in and process the tag-stored data required for the graphical representation from a single tag.

In an alternative embodiment of the reading apparatus, the apparatus further comprises a device positioning arrangement for moving the memory-tag reading device to a location commanded by the control processor for reading a memory tag at that location, the tag-stored data required for the graphical representation being distributed over more than one tag and the control processor being arranged, following the reading from a memory tag of location data that gives the location of at least one other said tag, to command the device positioning arrangement to move the memory-tag reading device to the location of the or each said at least one other tag, unless that tag has already been visited, in order to permit the device to collect the data required for the graphical representation.

According to a still further aspect of the present invention, there is provided apparatus comprising:
 a control processor;
 a memory-tag read/write device;
 a device positioning arrangement for moving the read/write device to a location commanded by the control processor for reading/writing a memory tag embedded in or attached to a base medium of an object presented to the apparatus;
the control processor being arranged to use tag-location data read in by the read/write device from a memory tag of the object to locate at least one memory tag of the object whereby to facilitate the writing of data items in multiple memory tags of the object.

According to a yet further aspect of the present invention, there is provided apparatus comprising:
 a memory-tag read/write device for reading/writing memory tags embedded in or attached to a base medium of an object presented to the apparatus;
 a printing assembly for printing said base medium of the object in correspondence to print data items written, or to be written, by the read/write device to the memory tags of the object; and
 a control processor arranged to use tag area-of-responsibility data read in by the read/write device from at least one memory tag of the object to determine in which tag to write each said print data item having regard to where the print data item has been or is to be printed on the object.

BRIEF DESCRIPTION OF THE DRAWINGS

Embodiments of the invention will now be described, by way of non-limiting example only, with reference to the accompanying drawings, in which.

DETAILED DESCRIPTION OF THE PREFERRED EMBODIMENTS

Figure 1:
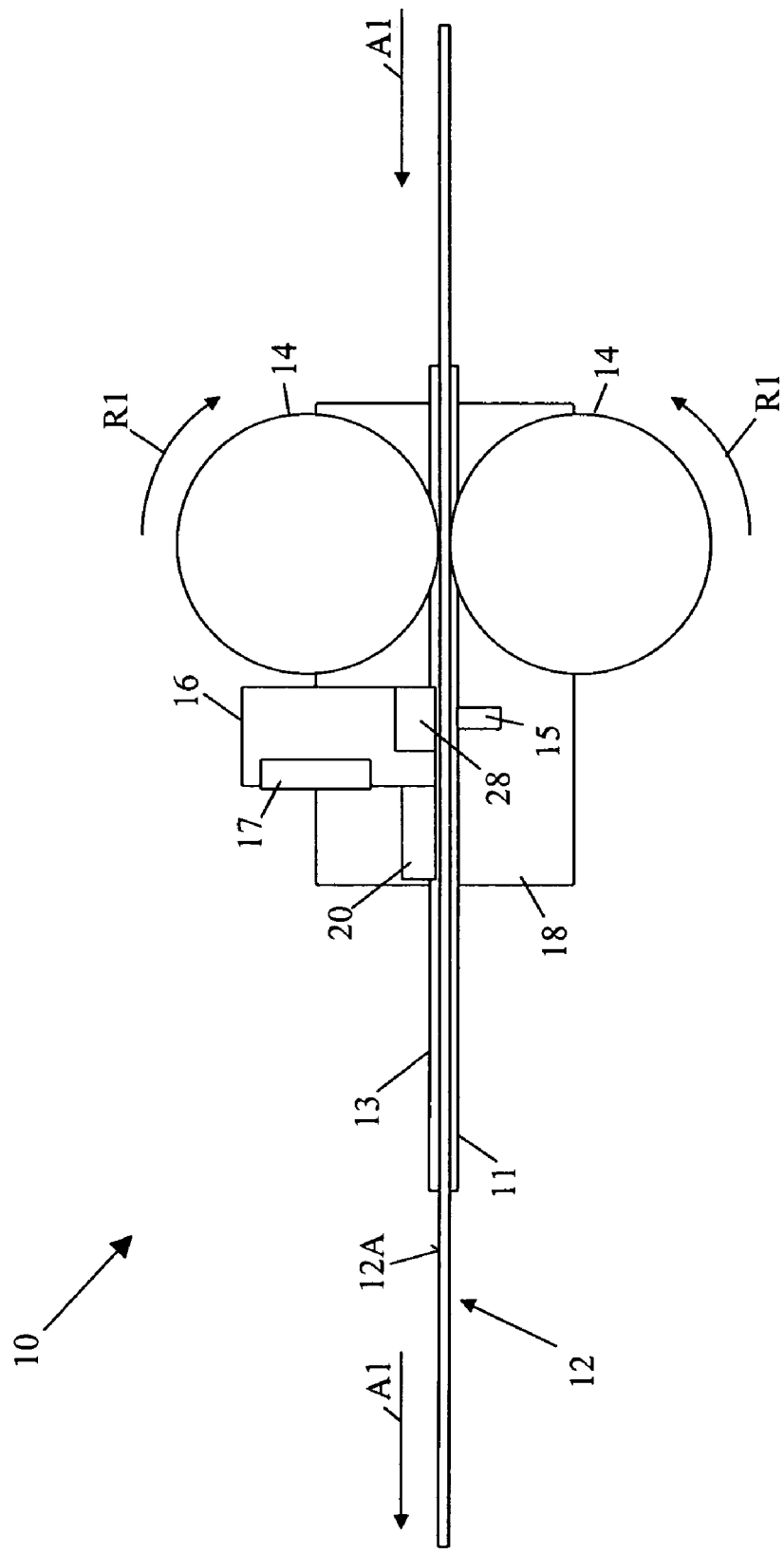
FIG. 1 is a diagrammatic side view of printer apparatus provided with a memory tag read/write device.
Figure 2:
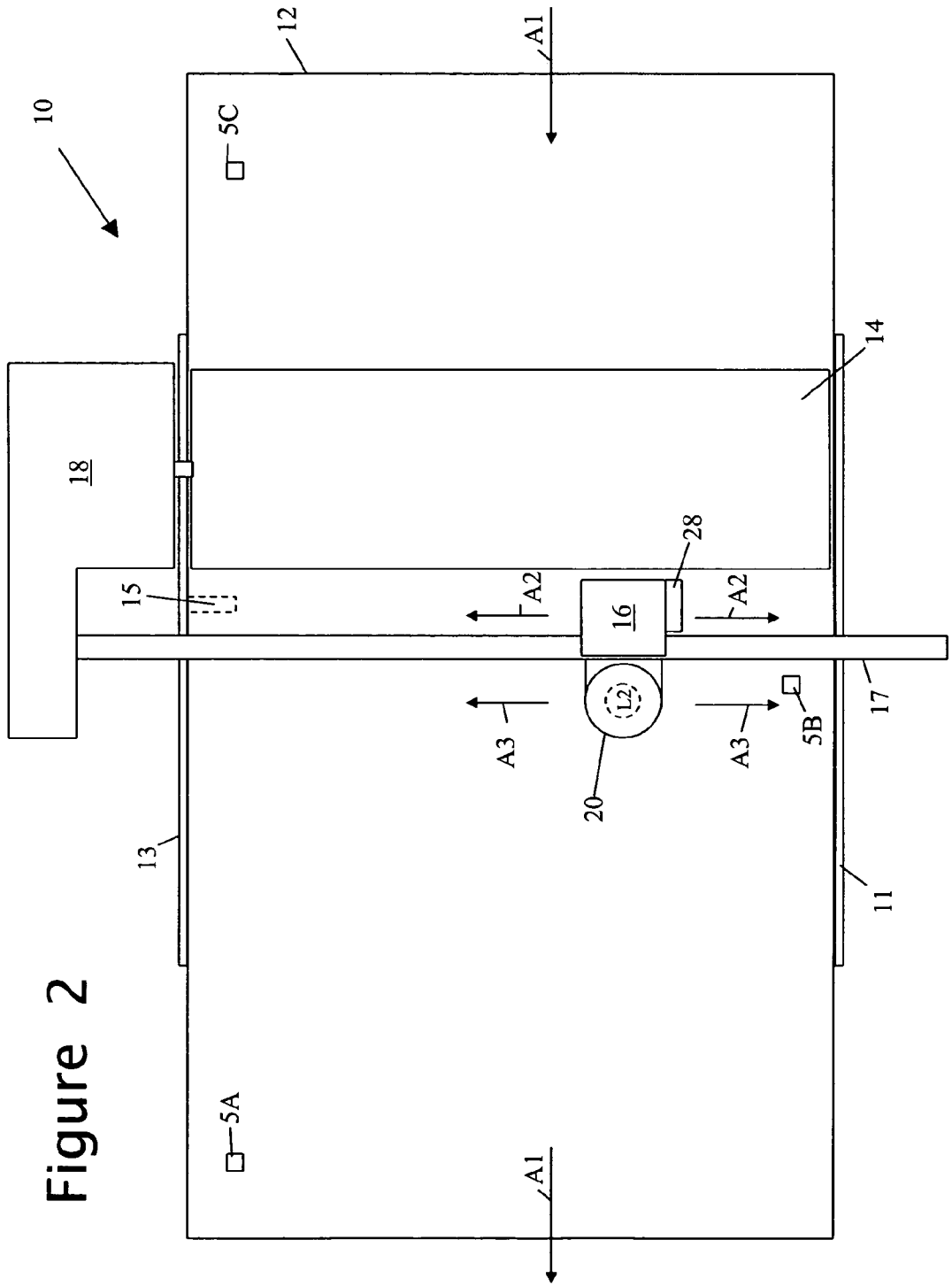
FIG. 2 is a diagrammatic plan view of the FIG. 1 apparatus.

Referring to FIGS. 1 and 2, apparatus 10 for printing onto a base medium and data writing to one or more memory tags in or on the base medium is illustrated. In the present example, the base medium takes the form of loose sheets 12, such as paper sheets, to which memory tags 5 have been applied or within which memory tags 5 have been embedded (in FIG. 2, the sheet 12 is shown as provided with three memory tags 5A, 5B and 5C). The memory tags 5 are RFID memory tags for which the manner of writing data to the tags and reading data from the tags is well known (see for example the RFID Handbook, Klaus Finkenzeller, 1999, John Wiley & Sons). For simplicity only those parts of the apparatus 10 which need to be shown to describe the invention are illustrated and described. It will be understood that the apparatus 10 includes much known technology from the prior art of printers, and from the prior art of RFID memory tags, which is not described here.

The apparatus 10 comprises a platen 11 and paper feed rollers 14 which are driven, by drive mechanism 18, to rotate as indicated by arrows RI to feed the sheets 12 across the platen 11 along a first axis in the direction indicated by arrows A1. The platen has an upstanding reference edge 13 for locating one edge of the sheet 12 as it is moved across the platen by the rollers 14. A leading edge sensor 15 embedded in the platen is arranged to sense the passing of the leading (and trailing) edges of the sheet 12.

The apparatus 10 further includes a print-head carriage 16 which carries a print head (not separately referenced) which in this example is of ink jet form. The print-head carriage 16 is mounted on a guide rail 17 which extends across the apparatus 10 substantially perpendicular to the axis A1. The print-head carriage 16 is moveable back and forth along the guide 17 in known manner by drive mechanism 18. Thus the print head is moveable back and forth along a second axis indicated by arrows A2, substantially perpendicular to the axis A1, to enable the print head to access most of the upper surface 12A of the paper sheet 12 as it moves through the apparatus 10, and thus to print anywhere on that accessible area of surface 12A as required.

The print-head carriage 16 also mounts a memory tag read/write device 20, and a marking sensor 28. The marking sensor 28 is operative to sense special markings applied to a sheet 12, such as markings made using an infrared-visible ink not visible to the normal human eye and not normally used by the print head; as will be more fully explained hereinafter, such markings are used to provide a way of inputting user selection data to the apparatus 10.

The memory tag read/write device 20 operates to write data to and/or read data from memory tags 5 as required using an inductive coil L2. Due to its mounting on the carriage 16, the inductive coil L2 of the memory tag read/write device 20 is moveable back and forth along a third axis indicated by arrows A3, substantially perpendicular to the axis A1, and parallel to the axis A2, to enable the memory tag read/write device 20 to read data from and/or write data to memory tags 5 located anywhere on or in the accessible area of the sheet 12.

Figure 3:
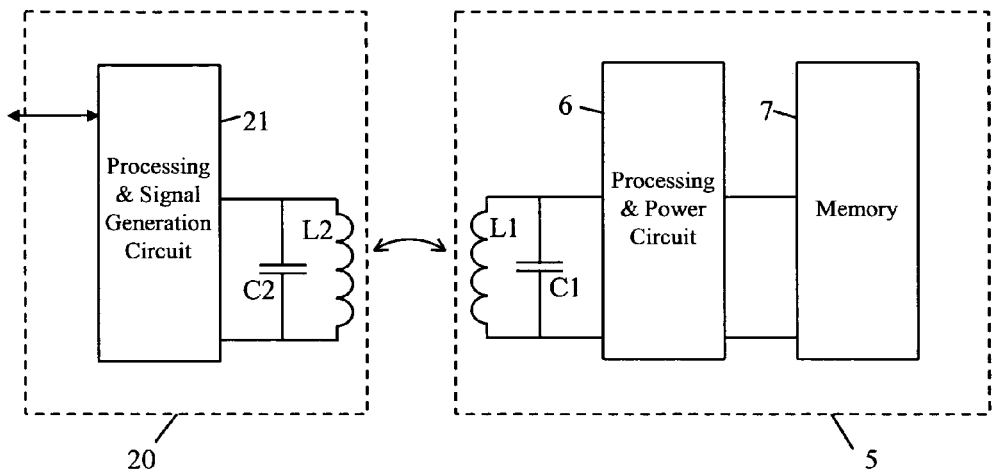
FIG. 3 is a diagram of a memory tag and the read/write device of the FIG. 1 apparatus.

Referring now to FIG. 3, the basic operation of a memory tag 5 and of the read/write device 20 will be described. A memory tag 5 includes an antenna coil L1 and a capacitor C1 connected in parallel therewith to form a resonant circuit. The tag 5 further includes a memory 7 and processing and power circuitry 6. The read/write device 20 includes an antenna coil L2 and a capacitor C2 in parallel therewith to form a resonant circuit, and a processing and signal generating circuitry 21.

A signal generator within circuitry 21 generates a signal at the chosen frequency, such as 2.45 GHz; this signal is applied to the antenna coil L2 and thus generates an electro-magnetic field which, provided the memory tag 5 is sufficiently close to the read/write device 20, penetrates the antenna coil L1 of the memory tag 5. By induction a voltage is thus generated in the antenna coil L1. This induced voltage is rectified in circuitry 6 and used to power the memory tag 5. The capacitance of the capacitors C1 and C2 is selected such that the resonant circuits are both resonant at the frequency generated by the signal generator, in order to maximise transmitted signal strength and received signal.

When data is to be written to the memory tag 5 by the read/write device 20 the radio frequency signal generated in circuitry 21 is modulated, e.g. amplitude modulated, with the data before being applied to the antenna coil L2 and transmitted. The signal received by the memory tag 5 by inductive coupling thus both powers the memory tag 5 and communicates with it, the circuitry 6 separating the data signal from the carrier and passing data for storage to the memory 7.

Similarly, if data is to be read from the memory tag 5 the circuitry 6 applies a signal indicative of the data to the antenna coil L1 which is detected, as a result of the inductive coupling, by antenna coil L2 and deciphered in circuitry 21 before being output from the read/write device 20. This signal may for example be transmitted using load modulation. In RFID systems such as this the power consumed by the memory tag 5 can be measured as a drop in voltage across the internal resistance of the antenna coil L2 of the read/write device 20. A load resistance within the circuitry 6 may be switched on and off, thus altering the power consumed by the memory tag 5 which is then detected as an amplitude modulation of the voltage across the antenna coil L2 of the read/write device 20.

Figure 4:
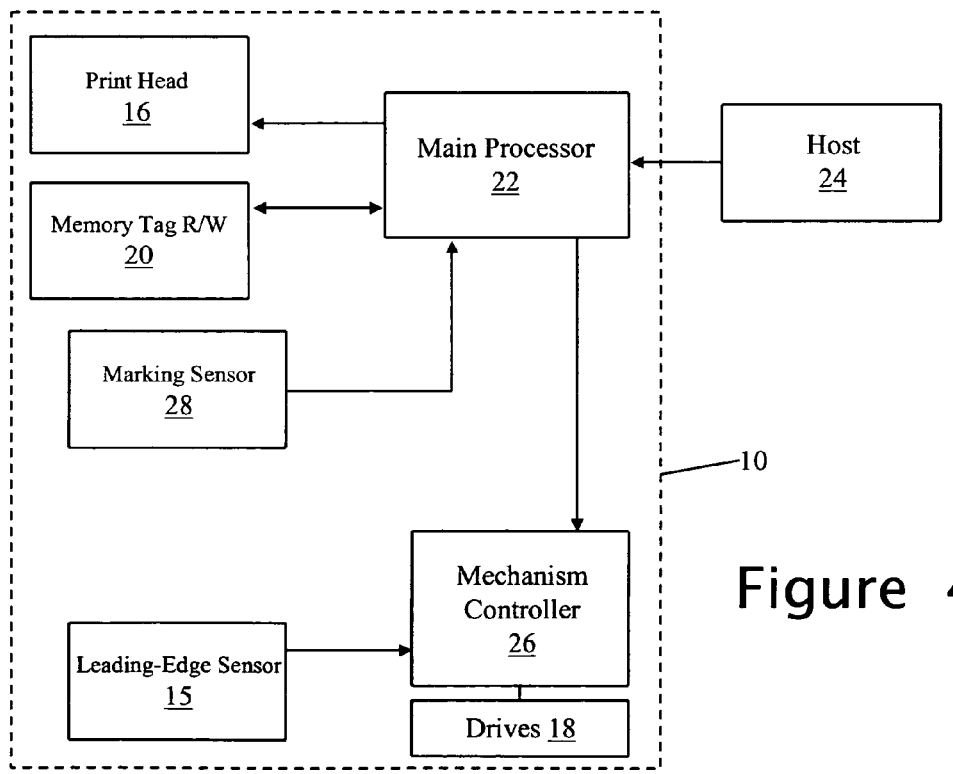
FIG. 4 is a block diagram of the functional components of the FIG. 1 apparatus.

Returning to a consideration of the printer apparatus 10 as a whole, FIG. 4 shows the main functional components in block diagram form. In addition to the components already described (namely, print head 16, memory tag read/write device 20, sensors 15 and 28, and drive mechanism 18), the apparatus includes a main processor 22, typically a program-controlled processor, arranged to receive input from an external device (such as a host computer 24), and a mechanism controller 26 for controlling the drive mechanism 18 to move the paper sheet 12 and the print-head carriage 16 as commanded by the main processor 22.

The mechanism controller 26 is arranged to position the print head over the sheet 12 at a position specified by the main processor 22 in standard units (such as millimetres) relative to a frame of reference established by the edges of the sheet (in particular, the sheet edge up against the reference edge 13 and the sheet leading edge as detected by sensor 15). As will be understood by persons skilled in the art, this is achieved by providing for the conversion of the units of measure provided by the processor 22 into the basic positioning units, such as stepping motor increments, used by the drive mechanism 18. This conversion utilises both scaling factors between standard measurement units and drive-mechanism units, and offset values. These offset values comprise a fixed offset value between the reference edge 13 and the drive mechanism position measure in the direction of axis A2 when the print head is aligned with the edge 13, and the value of the drive mechanism position measure in the direction of axis A1 when the sensor 15 detects the leading edge of the sheet 12.

In addition to responding to commands from the processor 22 to position the print head at a particular position over the sheet 12 relative to the sheet-edge frame of reference, the mechanism controller 26 is also arranged to respond to commands from the processor 22 to position either one of the memory tag read/write device 20 and the marking sensor 28 at a specified position above the sheet 12 relative to the sheet-edge frame of reference (it being appreciated that this simply involves the controller 26 positioning the print head at a position offset relative to the specified position by an amount corresponding to the actual offset, relative to the print head, of the element 20 or 28 being positioned).

The main processor 22 receives data and instruction signals from the host computer 24, including:
the print data items (text, images etc) to be printed;
where to print these print data items (alternatively, the processor 22 may determine printing locations itself based on what print data items it receives);
meta data items that are associated with specified locations on the sheet 12, but which are not to be printed;
generic data such as author and date, size of sheet 12, etc;
the location of each memory tag 5 in/on the paper sheet 12 and its area of responsibility, as explained below (alternatively, this information can be derived by the apparatus by scanning the sheet using the device 20 to determine the location of the or each tag 5, and by the apparatus remembering where it has written data items); and
global index data indicating in which memory tags the print and meta data items are respectively stored (again, this data may alternatively by determined by the apparatus 10 itself).

As indicated, not all of the above data is required in all cases and further examples of the omission of some of this data are given below. The main processor 22 sends command signals as required to:
the mechanism controller 26;
the print head 16; and
the memory tag read/write device 20,
to print the print data items where required and to write the print data items, the meta data items, the generic data, and various items of location data to the memory tags 5.

Thus the sheet 12 is fed through the apparatus 10 and has the required information printed on its upper surface 12A. At the same time the memory tags 5 on or within the paper sheet 12 have the necessary data written to them by the memory tag read/write device 20, with the movement of the memory tag read/write device 20 (and print head 16) being paused with the memory tag read/write device 20 over each memory tag 5 as necessary for the data writing to take place.

The manner of co-ordination of the printing and data writing processes will depend on a number of factors. If, for example, the memory tags 5 are only present adjacent the top and/or bottom of the paper sheet 12 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 12.

To facilitate reading of the memory tags 5 by hand held readers, the memory tags 5 can have icons printed over their locations which can be readily identified by users.

The memory tag read/write device 20 may, in addition to writing the data to the memory tags 5, also conduct a read operation to check that the data has written successfully before the paper sheet 12 is moved on following the data write operation. Alternatively, particularly if the apparatus 10 is operating at high speed, a separate data check device (not shown) may be included in the apparatus such that this operation takes place downstream of a memory tag write device which in this case need not also be capable of data reading.

Figure 5:
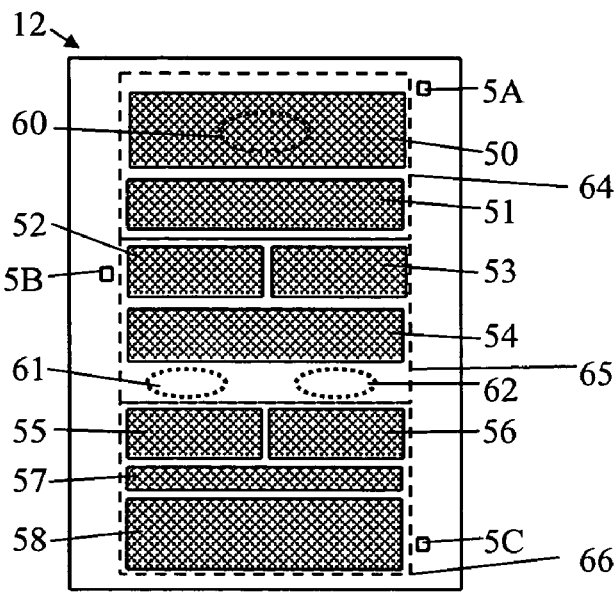
FIG. 5 depicts an example sheet printed and written to by the FIG. 1 apparatus, the sheet being provided with three memory tags.

FIG. 5 depicts an example sheet 12 printed and written to by the apparatus. The FIG. 5 sheet 12 has nine items 50 to 58 printed on it and three memory tags 5A, 5B, 5C that store the print data items corresponding to printed the items 50 to 58. Each memory tag has a respective associated "area of responsibility" on the sheet 12, these areas being indicated by dashed boxes 64, 65, and 66 for the tags 5A, 5B and 5C respectively. Each tag 5A, 5B, 5C stores the print data items corresponding to the printed items lying within in its respective area of responsibility. Thus, memory tag 5A stores the print data items 50 and 51 as the corresponding printed items lie within the area of responsibility 64 associated with tag 5A; similarly, tag 5B stores the print data items corresponding to printed items 52 and 53, and tag 5C stores the print data items corresponding to printed items 55-58.

FIG. 5 also indicates, by dotted ovals 60, 61 and 62, three "hot spot" locations on the sheet 12 each of which is associated with a respective meta data item. The hot spot locations are locations that if user-selected in an appropriate manner, result in some action being carried out in respect of the corresponding meta data item. The action carried out may be specified by the meta data item itself, by external input, or by the selection context. Each meta data item, like each print data item, is stored in the tag whose area of responsibility covers the position on the sheet associated with the data item. Thus the memory tag 5A stores the meta data item corresponding to dotted oval 60, whilst the memory 5B stores the meta data items corresponding to the dotted ovals 61 and 62.

It should be noted that the "area of responsibility" of each memory tag 5A, 5B, 5C can be defined either independently of the data items to be written to the memory tags of a sheet, or in dependence on these items. In the former case, the area of responsibility of each memory tag can be pre-defined and stored in the tag (for example, at the time of manufacture of the sheet 12 with the tags attached to/embedded in it); in the latter case, the host computer 24 or apparatus 10 can retrospectively define the area of responsibility of each memory tag 5A, 5B, 5C after have written all the data items associated with the sheet into the memory tags of the sheet. Of course, where the area of responsibility of a tag is pre-defined, it is up to the apparatus to ensure that the data items falling within that area of responsibility are indeed stored to the tag concerned.

Figure 6:
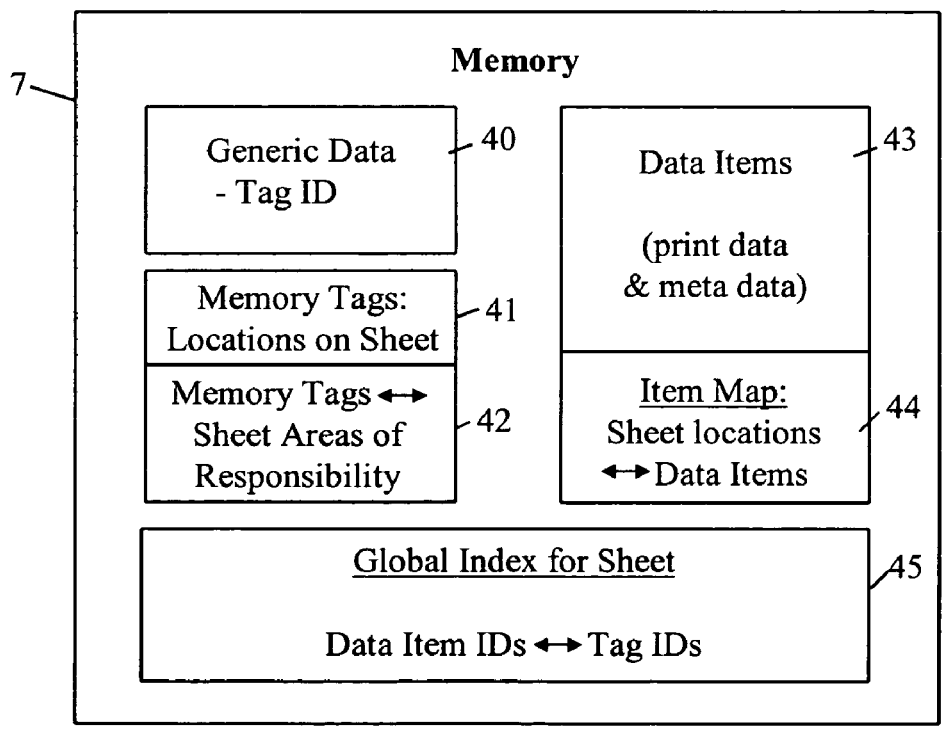
FIG. 6 is a diagrammatic representation of the contents of a memory tag 5 of the FIG. 5 sheet after being written to by the FIG. 1 apparatus.

FIG. 6 depicts the contents of the memory 7 of one of the memory tags 5A, 5B, 5C after it has been written to by the memory tag read/write device 20. In this example, the contents of the memory 7 is divided into six data blocks 40 to 45.

The data block 40 comprises the generic data provided by the host computer 24 and may additionally include data such as a read-only unique reference number for the tag itself, tag compatibility information, and manufacturing details.

The data block 41 comprises location data in respect of the memory tags 5A, 5B, 5C provided in or on sheet 12; in particular, this data comprises the location of the or each tag relative to the sheet-edge frame of reference. This location need not necessarily be precisely identified but could simply indicate the general location of the tag concerned (where the tags are subsequently to be read by a hand-held reader, the precise location of a tag is unlikely to be of greater utility than its general location). The location data comprising block 41 thus enables a reading device to quickly determine where all other memory tags (if any) are located on the sheet. The tag location data can be written into the memory tags prior to the sheet being presented to the apparatus 10 (for example, as part of the process for manufacturing the sheets 12).

The data block 42 comprises location data in respect of the area of responsibility 64, 65, 66 of each of the memory tags 5A, 5B, 5C provided in or on sheet 12. This data facilitates access to data items stored in the memory tags by indicating which tag 5 is the appropriate one to access for data concerning a particular area of the sheet. As already explained, where the area of responsibility of a tag is pre-defined, the area-of-responsibility location data stored in the tag is used to determine which data items are stored to the tag.

The data block 43 comprises the print data items and the meta data items provided by the host computer 24.

The data block 44 comprises a map that relates areas of the sheet 12 (more particularly, the printed areas and the metadata hotspots) to specific print or meta data items held in data block 43.

The data block 45 comprises a global index for the sheet, this index relating each data item by title and type (print or meta) to the tag 5A, 5B, or 5C in which it is stored.

As will be seen below, whilst the data block 41 comprising the tag locations will generally always be present, one or more of the data blocks 42, 44 and 45 may be omitted according to circumstances. In fact, the data block 41 can be omitted in certain cases though then either the data block 42 will be present or data equivalent to that of data block 41 will be held in the memory 7.

Figure 7:
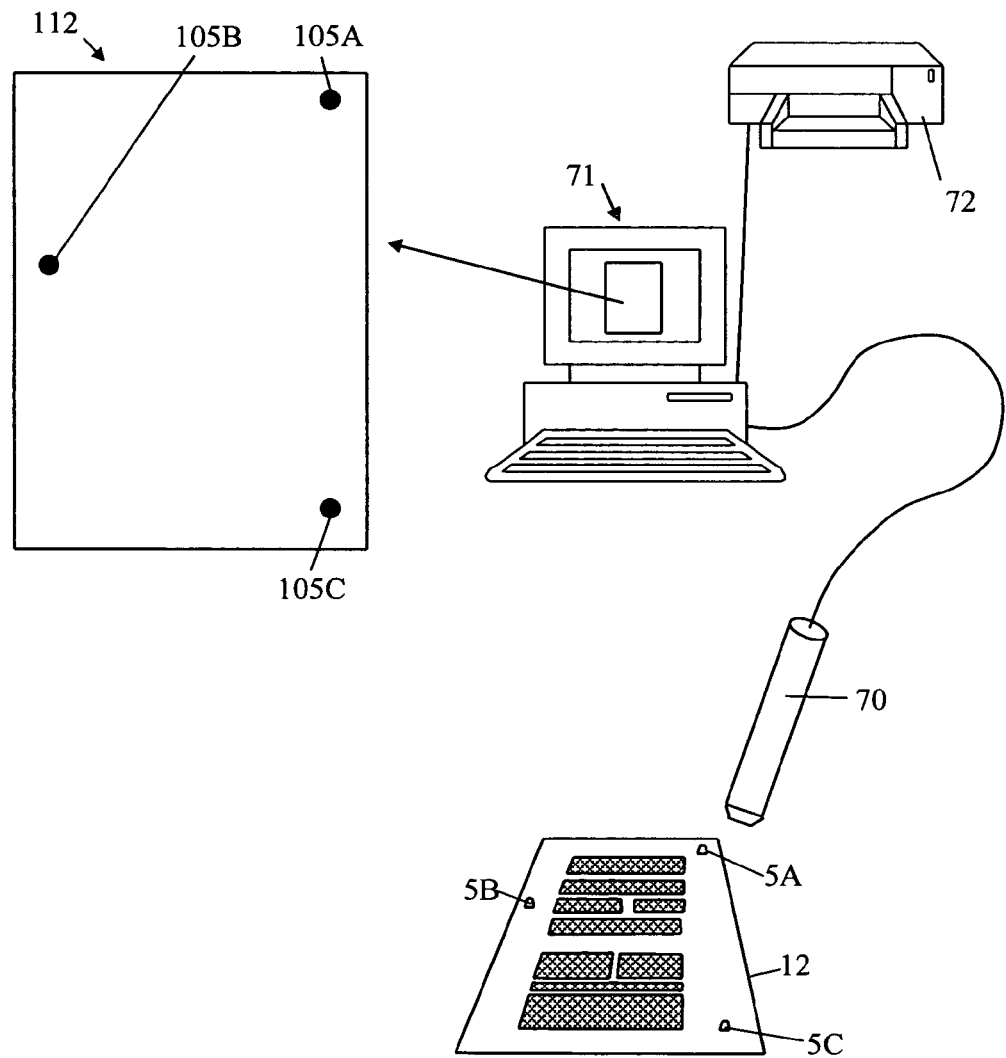
FIG. 7 illustrates an arrangement for using a hand-held memory tag reader to read memory tags of the FIG. 5 sheet after writing of the latter, the Figure further showing a displayed graphical representation of the sheet depicting the locations on the sheet of the memory tags.

Once the sheet has been printed and written to as described above, it can be used in a variety of ways. By way of example, it will be assumed that the sheet 12 is provided to a person with access to a hand-held memory-tag reader 70 connected to a general purpose computer 71 (see FIG. 7).

Upon the reader 70 being placed in juxtaposition to one of the memory tags 5A, 5B, 5C, the data blocks 40 and 41 are read into the computer 71 and used to display a graphical representation 112 of the sheet 12 with indications 105A, 105B, and 105C showing the locations of all the memory tags on the sheet 12. (In the following, all references above 100 refer to displayed features; where a displayed feature corresponds to a referenced physical feature, such as the sheet 12 or one of the tags 5A, 5B, 5C, then the reference used for the displayed feature is 100 more than the reference used for the corresponding physical feature).

By displaying indications of the locations of the memory tags, access to these tags is facilitated thereby facilitating access to the data items stored in these tags.

Figure 8:
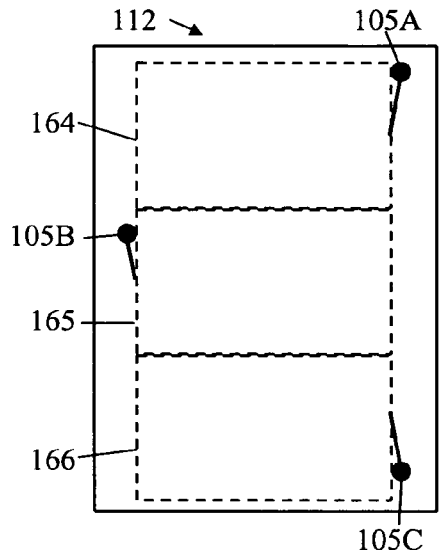
FIG. 8 shows a graphical representation of the FIG. 5 sheet, displayed using the FIG. 7 arrangement, depicting areas of responsibility for the memory tags of the sheet.

If the "areas of responsibility" data block 42 has also been written in the memory tag read by the reader 70, then these areas can also be depicted on the graphical representation of the sheet. This is illustrated in FIG. 8 where dashed boxes 164, 165 and 166 represent the boundaries of the areas of responsibilities 64, 65, 66 shown in FIG. 5. Each of the "area-of-responsibility" boxes 164, 165, and 166 is associated with a corresponding one of the tag location indications 105A, 105B, 105C (for example by a connecting line or by colour) to show which tag should be accessed to retrieve the data items relevant to a particular area of the sheet. Since the user has the printed sheet 12, it is a simple matter to determine from the location of an item of interest on the sheet 12 and the FIG. 8 displayed graphical representation 112 of the sheet, which tag should be accessed to read the data item corresponding to the item of interest. Once the data item has been accessed, it can be utilised as required; for example it can be individually printed (possibly after editing) on a standard printer 72, stored in the computer, or forwarded electronically.

Of course, when reading a memory tag the reader 70 will typically read all the data blocks. In particular, the contents of the data-item data block 43 will normally be read into the computer 71 whereby the graphical representation 112 of the sheet can be supplemented by a display of the print data items in their corresponding locations on the sheet (see FIG. 9 which shows displayed print data items 150, 151 corresponding to the print data items read from tag 5A and therefore located within the displayed area-of-responsibility box 164 of that tag). The presence of meta data items can also be indicated (see dashed oval 160 indicative of hotspot 60) and, indeed, the meta data items can be set out in full on the screen of the computer 71.

Figure 10:
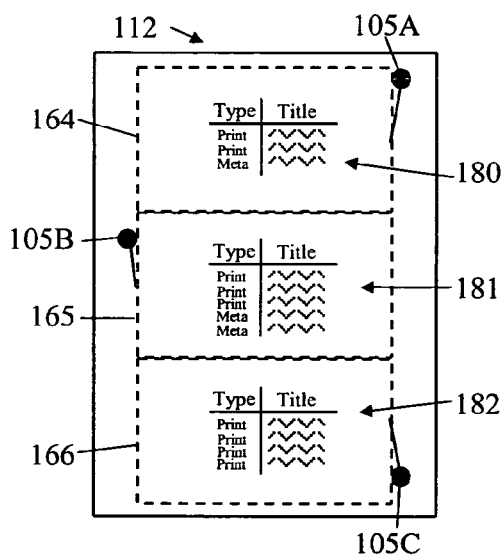
FIG. 10 shows a displayed graphical representation similar to that of FIG. 8 but further displaying an index of tag data items for each tag area of responsibility.

If the global index data block 45 has been written in the memory tag read by the reader 70, then this index can conveniently be displayed in the form of a respective sub-index 180, 181, 182 for each tag, each sub-index being displayed within the area-of-responsibility box of the corresponding tag (see FIG. 10). Again, this sub-index display facilitates access to a data item of interest.

Figure 11:
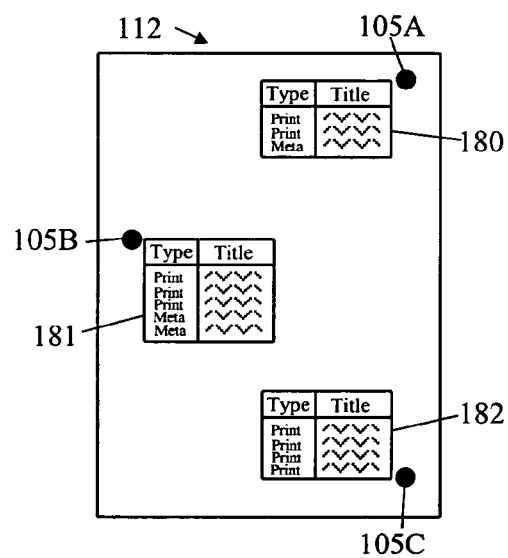
FIG. 11 shows a graphical representation of the FIG. 5 sheet, displayed using the FIG. 7 arrangement, depicting an index of tag data items for each memory tag of the sheet.

As an alternative to the FIG. 10 display, particularly in the case where the area-of-responsibility data block 42 has not been written, the sub-indexes 180, 181 and 182 can be displayed against the corresponding tag location indications 105A, 105B, 105C as is indicated in FIG. 11.

Figure 12:
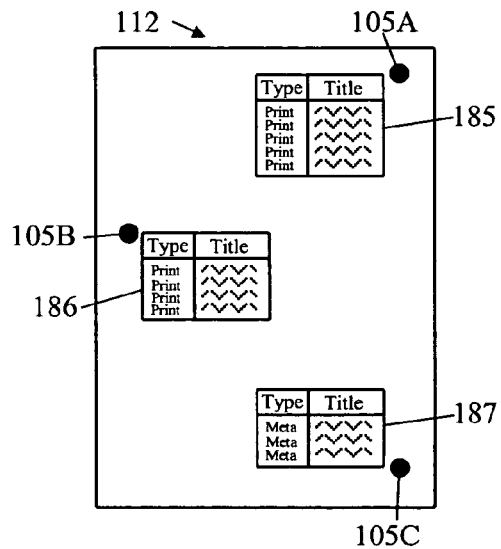
FIG. 12 shows a displayed graphical representation similar to that of FIG. 11 but for a different association of data items with the memory tags of the sheet.

FIG. 12 shows a sub-index display similar to that of FIG. 11 but for the case where the data items associated with the sheet have been differently organised when written to the tags 5A, 5B, 5C. Thus, tag 5C now holds all the meta data items whilst the print data items are split between the tags 5A and 5B—in particular, tag 5A holds the print data items corresponding to printed items 50, 52, 53, 55 and 56, and the tag 5B holds the print data items corresponding to printed items 51, 54, 57 and 58. Because of this split of data items between tags, it is no longer possible to define a simple division of the sheet 12 into areas of responsibility for each tag. Whilst it would be possible to provide the data block 42 as the areas of each data item stored for each tag (thereby producing a composite "area of responsibility" for each tag), it is preferable to rely on the map data of data block 44, where written.

Figure 13:
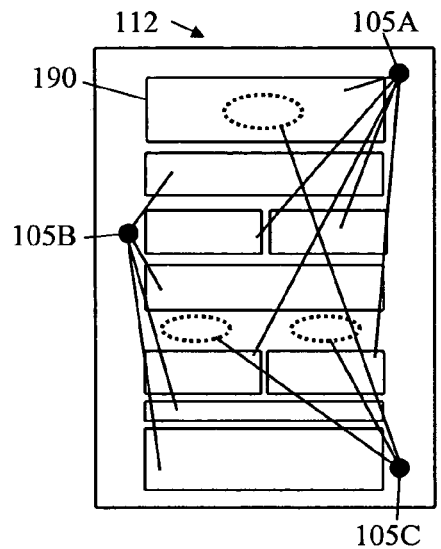
FIG. 13 shows a displayed graphical representation similar to that of FIG. 8 but for the data-item/tag association of FIG. 12.

Thus, as shown in FIG. 13, the item map comprising data block 44 enables the display of the areas of the sheet associated with data items held by each of the tags. As can be seen, in FIG. 13 lines are used to indicate in which tag the data item corresponding to each item area is stored (the relation between data item and tag being derived from the global index that comprises the data block 44). Other ways of indicating the association data item location and tag are, of course, possible such as by colour coding. It will be appreciated that the FIG. 13 display will only be possible if the data block 44 of the tag being read comprises a data item map for all data items associated with a sheet; if each tag only holds a data item map for the items it stores, then the association of data-item-area to tag can only be displayed for the or each tag that has been read (thus, where all tags have been read, FIG. 13 can be fully displayed).

Figure 14:
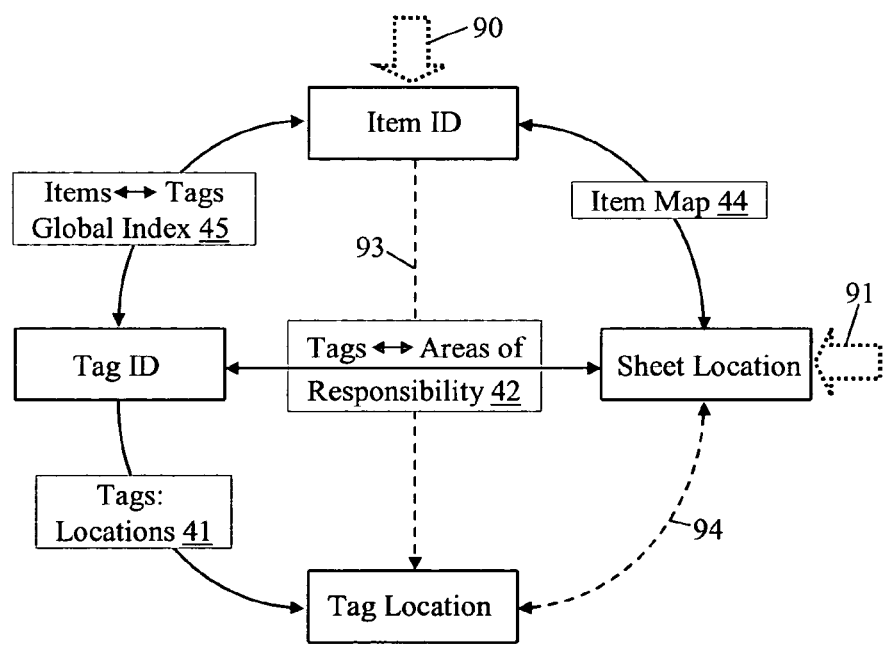
FIG. 14 is a diagram showing data elements and mappings between these elements enabled by data stored in a memory tag.

In the foregoing, a number of information displays have been described showing how information read from one of the memory tags 5A, 5B, 5C can be used to help a user access data items of interest. FIG. 14 is a diagram showing, in a more systematic manner, how the various mappings held by a tag can be used to inter-relate data elements and help a user access a desired data item. In FIG. 14, four data elements are shown, namely, tag ID, tag location, item ID and sheet location. These elements are related as follows:

the contents of the data block 41 serve to relate each memory tag to its location on the sheet 12;
the contents of the data block 42 serve to relate each memory tag to corresponding locations ("areas of responsibility") on the sheet 12;
the contents of data block 45 (the global index) serves to relate each data item to the corresponding memory tag in which it is stored;
the contents of data block 44 (item map) serves to relate each data item to corresponding locations on the sheet 12.

The foregoing relationships (referred to as "mappings" hereinafter) provided by the contents of the data blocks 41, 42, 44 and 45 (where written) are, of course, two way.

Typically, a user will select a data item of interest either by an associated data-item ID (including an associated descriptive element such as a title), or by its location on the sheet; these two selection routes are indicated by the dotted arrows 90, 91 in FIG. 14. The mappings serve to provide a connection between an item-ID/sheet-location that identifies a data item of interest, and the location of the tag holding that item. Thus, where a data item is selected by an item ID, then:

the mapping 45 (item ID to tag ID) serves to identify the corresponding tag, and the mapping 41 (tag ID to tag location) serves to identify the location of the tag on the sheet 12—this connection between item ID and tag location underlies the displays of FIGS. 11 and 12;
alternatively, the mapping 43 (item map) serves to identify the corresponding sheet area, the mapping 42 (tag areas of responsibility) serves to translate the identified sheet area into the tag storing the data item, and the mapping 41 identifies the location of this tag—such a connection between item ID and tag location could be used for the basis of the display of FIG. 10 though, in fact, the positioning of the item IDs (title) within the areas of responsibility boxes 164, 165, 166 is as a result of their association via mapping 45 with particular tags rather than as a result of use of the mapping 43.

Figure 9:
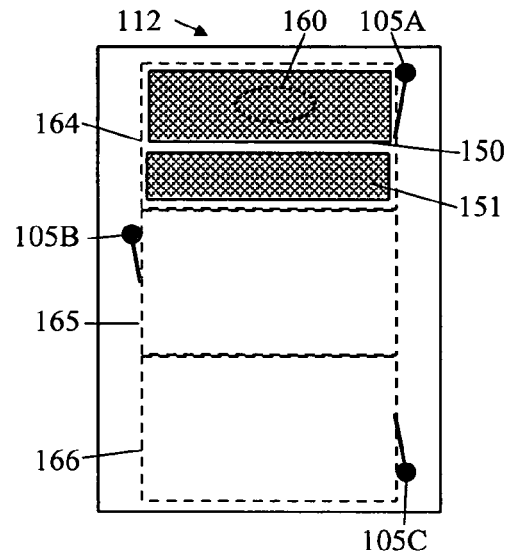
FIG. 9 shows a displayed graphical representation similar to that of FIG. 8 but further displaying print data items read from a currently-accessed one of the memory tags of the sheet.

Furthermore, where a data item is selected by its location on the sheet 12, then:

the mapping 42 (tag areas of responsibility) serves to translate the selected sheet area into the tag storing the data item, and the mapping 41 identifies the location of this tag—this connection between item location and tag location underlies the displays of FIGS. 8 and 9;
alternatively, the mapping 43 (item map) serves to identify the data item corresponding to the selected sheet area, the mapping 45 (item ID to tag ID) serves to identify the corresponding tag, and the mapping 41 (tag ID to tag location) serves to identify the location of the tag on the sheet 12—this connection between item location and tag location underlies the display of FIG. 13.

As indicated by the dashed arrows 93 and 94 in FIG. 14, other mappings are also possible. Thus arrow 93 represents a mapping directly linking item ID to the sheet location of the corresponding tag, and arrow 94 represents a mapping directly linking a sheet location with the sheet location of the corresponding tag. These further mappings can be stored in a memory tag in addition to, or as an alternative to one or more of the mappings 41, 42, 44, and 45 and used to produce displays similar to those already described above for helping a user access the tag holding an item of interest. Where only one of the mappings represented by the arrows 93, 94 is present in a memory tag, the mapping 44 (assuming it is present) can be used to convert an item selection input in the form of a sheet location/item-ID into an item-ID/sheet location whereby either form of selection input can be used with the available mapping represented by arrow 93/94 to identify the location of the tag holding the selected data item.

In the foregoing, the mappings held in the memory tags have simply been used to provide visual indications to a user to guide the user where to look for the desired data item, this being because the user is in charge of positioning the memory tag reader 70. Instead of the memory tags being read using a hand-held reader, it is possible to read the tags using a machine-positioned memory-tag reader such as is provided by the apparatus 10 of FIGS. 1 and 2. Thus, for example, the printed and written-to sheet 12 could be fed into apparatus of the form shown in FIGS. 1 and 2 with this apparatus being set in "read" mode, and the contents of the memory tags 5 read into a memory portion of the main processor 22 of the apparatus 10. Due to the tag location data held by each memory tag, once the first-accessed memory tag has been found and read (for example as a result of scanning the read device over the sheet starting from one end until a tag is found), the locations of the remaining tags will be known to the processor 22 which can then command the controller to move the read/write device 20 over each such remaining memory tag in turn without the need to scan the sheet 12 to locate them. Another way of enabling a first tag to be found is always to provide a tag at a standard, known, location on the sheet 12.

With regard to data item selection when using apparatus, such as the apparatus 10, for reading memory tags, the user's selection can be input in a number of different ways. For example, the apparatus can be connected to a host computer 24 and the mappings 41, 42, 44, 45 used to produce the same sort of displays as described above with reference to FIGS. 7 to 13. In this case, the user can make a selection using a pointing device (such as a mouse or a touch-screen display) with the host computer 24 being arranged to recognise the location of the display pointed at, and convert this location either directly into a data item ID or first into a location on the sheet 12 and then via the mapping 43 into an item ID. Any appropriate action can then be effected in relation to that data item. It will be appreciated that the apparatus will typically automatically read all the memory tags as soon as the sheet 12 is provided to it; as a result, the data items will normally already have been read into the host computer 24 at the time the user selects a data item via the display so that it will not be necessary to subsequently use the mappings to determine the location of the tag holding a data item (unless that data item is to be deleted or modified).

Figure 15:
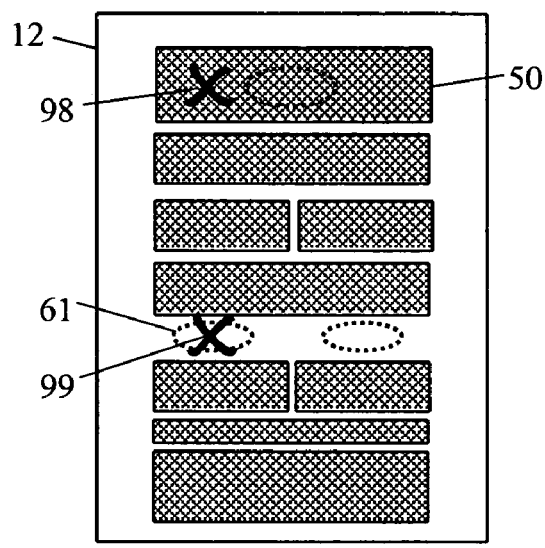
FIG. 15 shows the FIG. 5 sheet with markings made by a user to indicate areas of interest to the user, the marking being readable by the apparatus of FIGS. 1 and 2.

Another way of making a user selection of a data item is illustrated in FIG. 15 where the sheet 12 is shown as marked with two crosses 98 and 99 to indicate that the user is interested both in the print data item corresponding to printed item 50 and in the meta data item corresponding to hotspot 61. These markings 98, 99 are made using a marking ink to which the marking sensor 28 of apparatus 10 is sensitive. The sheet 12 is then fed into the apparatus 10 where it is scanned and the memory tags read; in addition, the sensor 28 detects the markings 98 and 99 and the locations of these markings are passed to the processor 22. The processor 22 (or a related host computer) converts these locations to the corresponding data items using the mapping 44 and takes appropriate action (for example, prints individual copies of each item or displays these items, depending on the instructions provided by the user).

Figure 16:
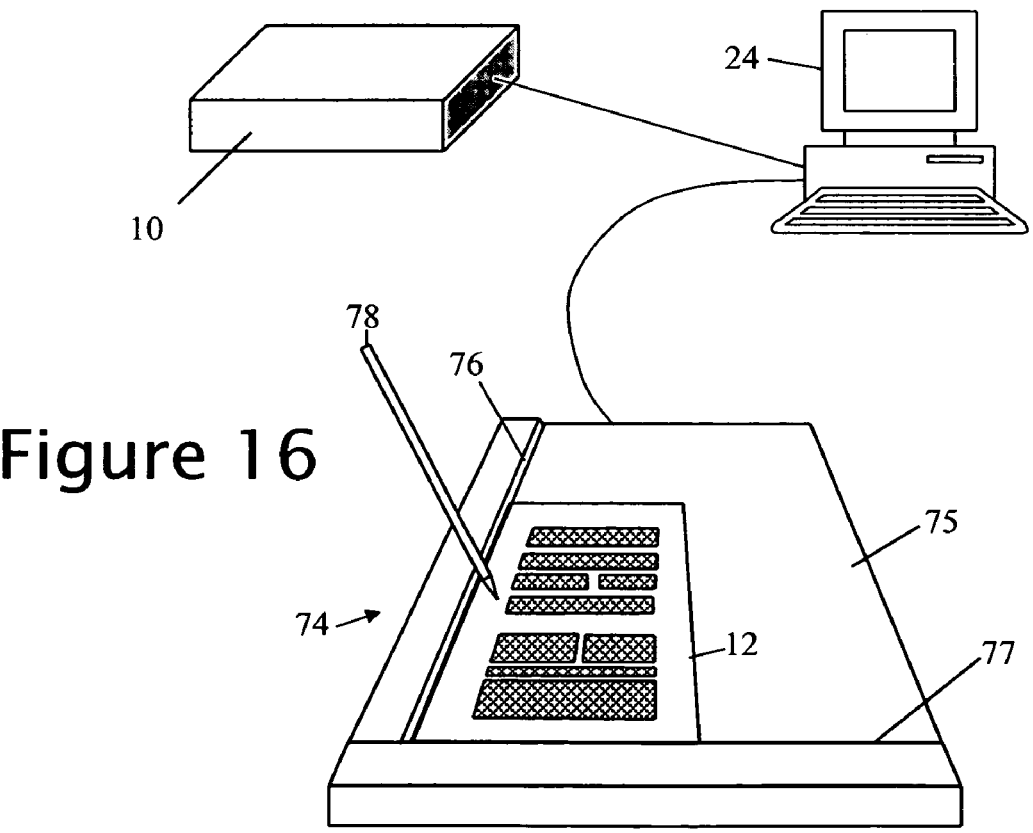
FIG. 16 illustrates the use of a graphics tablet to enable a user to indicate areas of interest on the FIG. 5 sheet.

FIG. 16 depicts a further way of inputting user selection, this time by the use of a graphics tablet 74. The graphics tablet is of standard form with a pressure sensitive surface 75 on which the sheet 12 is placed up against positioning reference edges 76, 77. The sheet has previously been fed through the apparatus 10 and the data stored in its memory tags read off and passed to host computer 24. A stylus 78 is used to select particular points on the sheet 12 by pressing down on the sheet at the appropriate locations. The position coordinates of each selected point are passed by the graphics tablet to the host computer 24 which uses these coordinates and the mapping 44 to determine what data item has been selected.

Many variations are, of course, possible to the above-described embodiments. For example, whilst all of the multiple memory tags of the sheet 12 have been described as storing the location of all tags, this information need only be held by one tag (for example, either a specially marked tag or the tag that will be first encountered by a tag reading device when the sheet is fed into tag reading apparatus such as the apparatus 10). Alternatively, where there are more than two tags, each tag can simply contain the location of a subset (such as one) of the other tags whereby to link the tags into a chain, tree or other single tag-organisation structure; of course, the tag or tags at the end or ends of such a structure (for example, the leaf tags of a tree structure) would not need to hold the location of another tag. A tag need not contain its own location on the basis that the reader will in any case know this location (though the stored location of a tag being read can provide useful feedback to the apparatus regarding the accuracy of its positioning system).

Whilst there are certain advantages in every memory tag of a sheet storing area-of-responsibility information for all tags, this is not needed in every case and a tag can be restricted simply to storing its own area-of-responsibility information.

It may be noted generally with respect to the mappings held by a memory tag that where a mapping is ostensibly global (that is, it relates to all tags/data items of the sheet 12), it may in fact be possible to omit the mapping data relating to the tag holding the mapping as the mapping data for that tag is either not needed or is otherwise derivable. For example, the location of the tag will be known at the time it is read so need not be included in the data block 41, and the data items held in the tag will similarly be known when the tag is read and so need not be listed in the global index 45.

With regard to the form of the apparatus 10, the memory tag read/write device 20 can be mounted on a read/write device carriage for movement independent of movement of the print head carriage movement. In this case, the read/write device carriage can be located either upstream or downstream of the print head carriage 18 and the mechanism controller 26 is arranged to position the read/write device carriage relative to the frame of reference established by the edges of the sheet 12 in the same manner as described above for the print-head carriage.

Of course, other arrangements as possible for positioning the print head 16 and/or the device 20 at a desired location relative to the sheet 12. Thus, for example, instead of the sheet 12 and [print head 16/device 20] being moveable in respective orthogonal directions as in the apparatus of FIGS. 1 and 2, means can be provided to displace one of the sheet 12 and [print head 16/device 20] in two orthogonal directions whilst the other of the sheet 12 and [print head/device 20] is kept stationary. Rather than using the edges of the sheet for establishing a frame of reference for positioning elements of the apparatus 10 (in particular, the print head 16 and/or the read/write device 20, and/or the sensor 28) over the sheet 12, other frames of reference can be used. For example, it would be possible to print the sheet with a positioning grid or pattern that is readable by a suitable sensor mounted on the or each element-mounting carriage; suitable positioning patterns are well known in the art (see, for example, WO-A-01/26032, Anoto AB). The positioning pattern could be provided pre-printed on the sheet 12 or could be printed by the print head 16 (though in this case it will typically still be necessary to use the sheet edges and the drive mechanism scaling factors to determine where to print the pattern). A further possibility for establishing a frame of reference for positioning is to use the location of a memory tag 5 embedded in, or attached to, the sheet 12 as the origin point of the frame of reference, the drive mechanism being calibrated to provide measures of displacement from this origin along axes defined by the mechanics of the apparatus and the orientation of the sheet. The sheet orientation will often be determined by the sheet edges abutting reference guides. However, since these edges could be damaged over time, it is preferable to provide some way of defining sheet orientation independently of the sheet edges. A number of ways of doing this are possible; for example, the sheet could initially be printed with markings defining axes (typically orthogonal axes) or the memory tag could be printed or physically formed with orientation markings that the apparatus could detect and use to orient the sheet 12 correspondingly. Alternatively, two or more memory tags could be positioned in or on the sheet such as to define sheet orientation, the apparatus again being arranged to orient the sheet 12 correspondingly or to computationally adjust for the orientation of the sheet.

Though in most embodiments the frame of reference used for sheet locations will not have its origin point coincident with the location of a memory tag, it is still possible for the location data stored by a memory tag to specify locations on the sheet relative to its own location. Thus, for example, the location data comprising the data block 41 of a memory tag can specify the locations of the other memory tags relative to the location of the tag storing the data.

Rather than the memory tag(s) being embedded in, or attached to, the sheet 12 prior to the sheet being introduced into the apparatus, it is possible to arrange for the apparatus to have a supply of memory tags with the apparatus first writing data to a tag before adhering it to the corresponding sheet, typically after it has printed the latter.

Thus both the writing and reading of the memory tags can be effected independently of any print operations and can be effected by apparatus without any printing capabilities. Indeed, in certain cases, the sheet 12 can be devoid of any printing (as would be the case if the only data items held by the memory tags were meta data items).

The above embodiments have been described as appropriate for use with base media in the form of loose sheets 12. However, embodiments can also be constructed for use with other base media, for example paper in fan fold or roll form, or indeed boxes or other objects (the term "base medium" in this context simply referring to the portion of the object not constituted by the memory tags).

In the above-described embodiments the memory tags 5 have all used RFID technology. However, it is also possible to use memory tags which operate at other frequencies, outside the radio frequency range.

The invention claimed is:

1. A physical object comprising a base medium with multiple memory tags embedded in the base medium or attached to the base medium, at least one memory tag storing location data concerning a location relationship between one or more of the tags and the object, said at least one memory tag storing location data about at least each other tag, this location data comprising tag-location data giving the location in or on the object of said at least each other tag.

2. A physical object according to claim 1, wherein every memory tag holds tag-location data about at least each other tag.

3. A physical object according to claim 2, wherein the tag storing the index data also stores map data indicating for each said data item stored by the tags an area of the surface of the object associated with that data item whereby to enable a selected area of the object surface to be mapped to a said data item.

4. A physical object according to claim 1, wherein every memory tag holds tag-location data about all of the tags.

5. A physical object according to claim 1, wherein each tag stores further location data comprising area-of-responsibility data indicating for that tag the area of the surface of the physical object for which the tag has responsibility in terms of storing data items relating to that area.

6. A physical object according to claim 1, wherein the tags store data items comprising at least one of print data items corresponding to items printed on the surface of the object, and meta data items associated with hotspot areas on the surface of the object; a said tag that stores tag-location data about at least all the other tags also storing index data associating at least the data items not stored by the tag with the tags in which those items are respectively stored whereby to enable a selected data item to be mapped to the tag in which it is stored, the location of this tag being derivable from said tag-location data.

7. A physical object comprising a single sheet of printable media with multiple memory tags embedded in said single sheet of printable media or attached to said single sheet of printable media, at least one of said memory tags storing location data concerning a location relationship between one or more of said multiple memory tags and said single sheet of printable media, wherein each said at least one memory tag stores location data about at least one other tag, this location data comprising tag-location data giving the location in or on the object of said at least one other tag, tag-location data about at least all but first said tag being distributed between the tags so as to link them into a single tag organisation such that tag-location data stored in the first tag can be used to locate the other tags either directly or through tag-location data stored in one or more other said tags to which the first tag is directly or indirectly linked by tag-location data.

8. A physical object comprising a single sheet of printable media with multiple memory tags embedded in said single sheet of printable media or attached to said single sheet of printable media at least one of said memory tags storing location data concerning a location relationship between one or more of said multiple memory tags and said single sheet of printable media;
wherein a said at least one memory tag stores location data comprising area-of-responsibility data indicating for each tag an area of a surface of the single sheet of printable media for which that tag has responsibility in terms of storing data items relating to that area;
wherein a said tag that stores said area-of-responsibility data also stores tag-location data giving the location in or on the object of at least each other tag whereby to enable a selected area of the object surface to be mapped, via the area-of-responsibility data and tag-location data, to the location of the tag responsible for that area of the surface of the object.

9. A physical object comprising a single sheet of printable media with multiple memory tags embedded in said single sheet of printable media or attached to said single sheet of printable media, at least one of said memory tags storing location data concerning a location relationship between one or more of said multiple memory tags and said single sheet of printable media;
wherein a said at least one memory tag stores location data comprising area-of-responsibility data indicating for each tag an area of a surface of the single sheet of printable media for which that tag has responsibility in terms of storing data items relating to that area;
wherein the tags store data items comprising at least one of print data items corresponding to items printed on the surface of the object and data items associated with hotspot areas on the surface of the object; a said tag that stores said area-of-responsibility data also storing map data indicating for each said data item stored by the tags an area of the surface of the object associated with that data item whereby to enable a selected data item to be mapped to an area of the object and then, via the area-of-responsibility data, to the tag holding that data item.

10. A physical object according to claim 9, wherein the tag that stores both the area-of-responsibility data and said map, also stores tag-location data giving the location in or on the object of at least each other tag whereby to enable a selected data item to be mapped to the location of the tag storing that item.

11. A physical object comprising a base medium with multiple memory tags embedded in the base medium or attached to the base medium, at least one memory tag storing location data concerning a location relationship between one or more of the tags and the object, wherein the tags store data items comprising at least one of print data items corresponding to items printed on the surface of the object and data items associated with hotspot areas on a surface of the object; a said at least one memory tag storing location data comprising mapping data indicating for each data item stored by the tags the location in or on the object of the tag storing that data item.

12. A physical object according to claim 11, wherein a said tag that stores said mapping data also stores map data indicating, for each said data item stored by the tags, an area of the surface of the object associated with that data item whereby to enable a selected location on the surface of the object to be mapped to a said data item and then, via the mapping, to the location of the tag storing that data item.

13. A physical object comprising a single sheet of printable media with multiple memory tags embedded in said single sheet of printable media or attached to said single sheet of printable media, at least one of said memory tags storing location data concerning a location relationship between one or more of said multiple memory tags and said single sheet of printable media, wherein the tags store data items comprising at least one of print data items corresponding to items printed on the surface of the object and data items associated with hotspot areas on the surface of the object; a said at least one memory tag storing location data comprising mapping data indicating for areas on the surface of the object the locations in or on the object of the tags respectively responsible for data items associated with those area.

14. A physical object according to claim 13, wherein a said tag that stores said mapping data also stores map data indicating, for each said data item stored by the tags, an area of the surface of the object associated with that data item whereby to enable a selected data item to be mapped to an area of the object and then, via the mapping data, to the location of the tag storing that data item.

15. Memory-tag reading apparatus comprising:
a memory-tag reading device for reading location data from memory tags of an object that comprises memory tags embedded in or attached to a base medium, the location data concerning a location relationship between at least one said tag and the object;
a control processor for processing data read from one or more of the memory tags; and
a display device connected to the control processor and arranged to display a graphical representation of the object;
the control processor being arranged to use the location data read by the reading device to cause the displayed graphical representation of the object to depict said location relationship between the said at least one tag and the object;
wherein the location data comprises tag-location data giving the location in or on the object of all the tags, the control processor being arranged to cause the graphical representation to show the positions of the tags.

16. Apparatus according to claim 15, wherein the location data comprises area-of-responsibility data indicating for every tag, the area of the surface of the physical object for which the tag has responsibility in terms of storing data items relating to that area; the control processor being arranged to cause the graphical representation to show the area-of-responsibility of each tag.

17. Apparatus according to claim 16, wherein the memory-tag reading device is arranged to read in map data concerning data items that are stored in the tags and that comprise at least one of print data items corresponding to items printed on the surface of the object and data items associated with hotspot areas on the surface of the object, the map data indicating for each said data item an area of the surface of the object associated with that data item; the control processor being further arranged to cause the graphical representation to show which data items are associated with which tags as determined by the map data and area-of-responsibility data.

18. Apparatus according to claim 15, wherein the memory-tag reading device is arranged to read in index data concerning data items that are stored in the tags and that comprise at least one of print data items corresponding to items printed on the surface of the object and data items associated with hotspot areas on the surface of the object, the index data associating the data items with the tags in which those items are respectively stored; the control processor being further arranged to cause the graphical representation to show which data items are associated with which tags.

19. Apparatus according to claim 18, wherein the memory-tag reading device is arranged to read in map data concerning data items that are stored in the tags and comprise at least one of print data items corresponding to items printed on the surface of the object and data items associated with hotspot areas on the surface of the object, the map data indicating for each said data item an area of the surface of the object associated with that data item: the control processor being further arranged to cause the graphical representation to show which areas of the object are associated with which tags as determined by the map data and index data.

20. Apparatus according to claim 15, wherein the memory-tag reading device is a hand-held reader, the apparatus being arranged to read in and process the tag-stored data required for the graphical representation from a single said tag.

21. Apparatus according to claim 15, further comprising a device positioning arrangement for moving the memory-tag reading device to a location commanded by the control processor for reading a memory tag at that location, the tag-stored data required for the graphical representation being distributed over more than one tag and the control processor being arranged, following the reading from a memory tag of location data that gives the location of at least one other said tag, to command the device positioning arrangement to move the memory-tag reading device to the location of said at least one other tag, unless that tag has already been visited, in order to permit the device to collect the data required for the graphical representation.

22. Apparatus comprising:
a control processor;
a memory-tag read/write device;
a device positioning arrangement for moving the read/write device to a location commanded by the control processor for reading/writing a memory tag embedded in or attached to a sheet of printable media presented to the apparatus; the control processor being arranged to use tag-location data read in by the read/write device from a memory tag embedded in or attached to a sheet of printable media to locate at least one other memory tag embedded in or attached to the sheet of printable media whereby to facilitate the writing of data items in multiple memory tags embedded in or attached to the sheet of printable media.

23. Apparatus according to claim 22, further comprising a printing assembly for printing said sheet of printable media in correspondence to print data items written, or to be written, by the memory-tag read/write device to the memory tags embedded in or attached to the sheet of printable media.

24. Apparatus according to claim 23, wherein the control processor is arranged to use tag area-of-responsibility data read in by the read/write device from at least one memory tag embedded in or attached to the sheet of printable media to determine in which tag to write each said print data item having regard to where the print data item has been or is to be printed on the sheet of printable media.

25. Apparatus comprising:
- a memory-tag read/write device for reading/writing memory tags embedded in or attached to a sheet of printable media presented to the apparatus;
- a printing assembly for printing said sheet of printable media in correspondence to print data items written, or to be written, by the read/write device to the memory tags embedded in or attached to the sheet of printable media; and
- a control processor arranged to use tag area-of-responsibility data read in by the read/write device from at least one memory tag embedded in or attached to the sheet of printable media to determine in which tag to write each said print data item having regard to where the print data item has been or is to be printed on the sheet of printable media.

* * * * *